UNITED STATES PATENT OFFICE 2,543,992

PREPARATION OF DIALLYL ETHER DICHLOROHYDRINS

Gordon Hart Segall, McMasterville, Quebec, Canada, assignor to Canadian Industries Limited, Montreal, Quebec, Canada, a corporation of Quebec, Canada No Drawing. Application March 5, 1948, Serial No. 13,335. In Canada August 8, 1947

1 Claim. (Cl. 260—615)

This invention relates to diallyl ether dichlorohydrins and more particularly to an improved process for their preparation.

Diallyl ether dichlorohydrins, recently synthesized compounds having the formula

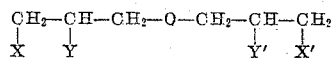

wherein X and Y, and X' and Y' are interchangeable chlorine and hydroxyl, X and X' being chlorine when Y and Y' are hydroxyl and Y and Y' being chlorine when X and X' are hydroxyl, have been described in copending application Serial No. 13,334 filed in the name of O. C. W. Allenby, together with a method for their preparation comprising reacting hypochlorous acid with diallyl ether monochlorohydrins. Because the diallyl ether monochlorohydrins are not readily available compounds but have to be prepared for this specific purpose, the above mentioned preparation of diallyl ether dichlorohydrins comprises a two-step reaction, thus requiring more equipment and also increasing losses by handling.

It is an object of this invention to overcome the foregoing disadvantages by providing a one step process for the preparation of diallyl ether dichlorohydrins. Another object is the preparation of diallyl ether dichlorohydrins in good yields and from readily available materials. A further object is the preparation of diallyl ether dichlorohydrins from diallyl ether and hypochlorous acid. Other objects will appear hereinafter.

These objects are accomplished by reacting diallyl ether with hypochlorous acid.

In a more specific embodiment, this invention comprises reacting a dispersion of diallyl ether in a dilute mineral acid, such as sulphuric acid, with an aqueous solution of a hypochlorite, said hypochlorite solution being added slowly to the diallyl ether acid dispersion. The hypochlorous acid liberated by the interaction of the mineral acid and the hypochlorite reacts with diallyl ether to form the dichlorohydrins. An alternative procedure is to react gaseous chlorine with a dispersion of diallyl ether in water. The diallyl ether dichlorohydrins produced by any of the foregoing methods may be isolated by extraction with a solvent followed by removal of the solvent by distillation.

The following examples are illustrative of the more detailed practice of this invention:

Example 1

60 grams of chlorine was passed into 1 liter of a 7% aqueous solution of sodium hydroxide at 1° C. thus producing a sodium hypochlorite solution titrating 4.3% as hypochlorous acid. 750 milliliters of this solution was then added at 10° C. over a 20 minute period to a dispersion of 35 grams of diallyl ether in 200 milliliters of a 12.5% aqueous solution of sulphuric acid. The water-insoluble material was afterwards filtered off, the clear filtrate extracted with 5 1-liter portions of ethylene dichloride, and the extract evaporated to remove the volatile solvent. A residue was thus obtained which was distilled at 120° C. under a 2 mm. pressure to liberate 26.5 grams of diallyl ether dichlorohydrins, i. e., a 36% yield. This compound had a refractive index of 1.4924 at 25° C.

24 grams of the above diallyl ether dichlorohydrins was then treated at 15° C. for 15 minutes with 50 milliliters of a 24% aqueous solution of sodium hydroxide. The solution was afterwards extracted with 5 50-milliliter portions of carbon tetrachloride, the solvent evaporated, and the extract residue distilled at 89–92° C. under a 5 mm. pressure. There was obtained 11 grams of diallyl ether dioxide, i. e., a 72% yield based on the dichlorohydrins used. This compound had a density of 1.1229 and a refractive index of 1.4452 at 23° C. Its molecular refractivity was calculated 30.89 and found 30.84. The boiling point of the purified material was found to be 86–87.5° C. at 5 mm. pressure.

Example 2

120 grams of chlorine was passed into 2 liters of a 7% aqueous solution of sodium hydroxide at 0° C., and the sodium hypochlorite solution thus obtained, titrating 4.3% as hypochlorous acid, was added to a dispersion of 86 grams of diallyl ether in 400 milliliters of an 11% aqueous solution of sulphuric acid. The addition was made at 10° C. over a 20 minute period with continuous stirring.

200 milliliters of a 70% aqueous solution of sodium hydroxide was then added to the above dispersion, and the resulting mixture was stirred for 15 minutes at 15° C. It was afterwards extracted with 5 1-liter portions of carbon tetrachloride, and the extract was evaporated to remove the solvent. The extract residue was distilled at 80–90° C. under a 1 mm. pressure, thus liberating 45 grams of diallyl ether dioxide, i. e., a 40% yield of diallyl ether dioxide based on the amount of diallyl ether used.

Example 3

To a dispersion of 75 grams of diallyl ether in 200 milliliters of a 25% aqueous solution of sulphuric acid, there was added a sodium hypochlorite solution, titrating 8.5% as hypochlorous acid, at 15° C. over a 20 minute period. This solution had been prepared by passing 120 grams of chlorine into 1 liter of a 14% aqueous solution of sodium hydroxide at 1° C. 910 milliliters of the hypochlorite solution was required before a positive test for hypochlorous acid was obtained in the reaction vessel.

The above mixture was then stirred at 15° C. for 15 minutes with 200 milliliters of a 70% aqueous solution of sodium hydroxide. It was afterwards extracted with 5 1-liter portions of carbon tetrachloride, and, after removal of the solvent, the extract residue was distilled at 80–90° C. under a 1 mm. pressure. 42 grams of diallyl ether dioxide was obtained, i. e., a 42% yield based on the weight of diallyl ether present in the reaction mixture.

*Example 4*

A sodium hypochlorite solution, titrating 4.3% as hypochlorous acid, was prepared by passing 60 grams of chlorine at 1° C. into 1 liter of a 7% aqueous solution of sodium hydroxide. This solution was added at 10° C. over a 15 minute period into a mixture of 35 grams of diallyl ether, 184 grams of sodium bicarbonate, and 400 milliliters of water.

A solution of 100 grams of sodium hydroxide in 200 milliliters of water was then added to the above mixture and was stirred at 15° C. for 15 minutes. An extraction with 5 1-liter portions of carbon tetrachloride left, after removal of the solvent, a residue which was distilled at 80–90° C. under a 1 mm. pressure. 17.0 grams of diallyl ether dioxide was thus obtained, i. e., a 37% yield based on the diallyl ether used.

*Example 5*

60 grams of chlorine was passed into a dispersion of 35 grams of diallyl ether in 1 liter of water at 10° C. over a 15 minute period. A solution of 100 grams of sodium hydroxide in 200 milliliters of water was then added to the above mixture and was stirred at 15° C. for 15 minutes. The mixture was afterwards extracted with 5 1-liter portions of carbon tetrachloride, and, after removal of the solvent, a residue was obtained which gave 22 grams of distillate on distillation. This distillate was then redistilled at 89–95° C. under a 5 mm. pressure, and 14.2 grams of diallyl ether dioxide was thus obtained, i. e., a 31% yield based on the amount of diallyl ether used.

Although other proportions may be used, it is preferred to use a ratio of 2 mols of hypochlorous acid to 1 mol of diallyl ether.

The reaction of diallyl ether with hypochlorous acid may be performed in various ways other than those disclosed in the foregoing examples. For instance, there may be reacted a dispersion of diallyl ether in water with a solution containing hypochlorous acid. An alternative procedure would be to add an acid stronger than hypochlorous acid to a dispersion of diallyl ether in an aqueous solution of a hypochlorite. The same result would also be obtained by running an aqueous solution of a hypochlorite and a dilute mineral acid simultaneously into an aqueous dispersion of diallyl ether.

Although the above examples disclose hypochlorite solutions of a concentration 8.5% hypochlorous acid or lower, higher concentrations may be used. Likewise, the concentration of the sulphuric acid solution may be varied provided the acid is in a sufficient amount to liberate all the available hypochlorous acid from the hypochlorite.

Other hypochlorites than sodium hypochlorite may be used for the purposes of this invention. However, when it is desired to convert the dichlorohydrins to the dioxide, it is preferred not to use a hypochlorite containing a metal whose hydroxide is essentially insoluble in strongly alkaline solutions, because this may necessitate filtration of the final reaction mixture before the dioxide can be extracted.

Somewhat higher temperatures than 10–15° C. may be employed in the addition of the hypochlorite solution to the diallyl ether. It is preferred, however, to keep the temperature at 10° C. or lower, because better yields of the product are obtained.

As disclosed in Example 1, ethylene dichloride is used to remove diallyl ether dichlorohydrins from the reaction mixture. However, other solvents, such as chloroform or ether, may be employed. In general, any solvent which is essentially insoluble in water and which will dissolve the dichlorohydrins without being attacked by them may be used.

As disclosed previously and also in copending application Serial No. 13,334, diallyl ether dichlorohydrins may be used for the preparation of diallyl ether dioxide. They may also undergo various reactions to give other new and useful compounds.

It is apparent that many widely different embodiments of this invention can be made without departing from the spirit and scope thereof; and, therefore, it is not intended to be limited except as indicated in the appended claim.

I claim:

A process for the preparation of diallyl ether dichlorohydrins which comprises adding to a dispersion of diallyl ether in an aqueous solution of sulphuric acid having a sulphuric acid concentration of from 11% to 25% by weight an aqueous solution of sodium hypochlorite titrating from 4.3% to 8.5% as hypochlorous acid by weight, the molar ratio of sodium hypochlorite to diallyl ether being 2:1, at a temperature not in excess of 10° C., subsequently extracting the reaction mixture with a water-insoluble organic liquid which is a solvent for the resultant diallyl ether dichlorohydrins, and recovering said dichlorohydrins from said extract by evaporating said organic liquid.

GORDON HART SEGALL.

REFERENCES CITED

The following references are of record in the file of this patent:

UNITED STATES PATENTS

| Number | Name | Date |
|---|---|---|
| 1,477,113 | Essex | Dec. 11, 1923 |
| 1,626,398 | Essex | Apr. 26, 1927 |

OTHER REFERENCES

Pariselle, Comptes Rendus, vol. 150 (1910), page 1056.

Zangler, "Annalen der Chemie," vol. 214 (1882), page 146.